(12) United States Patent
Maksimchuk et al.

(10) Patent No.: US 6,909,764 B2
(45) Date of Patent: Jun. 21, 2005

(54) METHOD AND APPARATUS FOR HIGH-ENERGY GENERATION AND FOR INDUCING NUCLEAR REACTIONS

(75) Inventors: Anatoly Maksimchuk, Ann Arbor, MI (US); Koshichi Nemoto, Nishitokyo (JP); Kirk Flippo, Ann Arbor, MI (US); Shaoting Gu, Nepean (CA); Sudeep Banerjee, Ann Arbor, MI (US); Donald Umstadter, Ann Arbor, MI (US); Gerard Mourou, Ann Arbor, MI (US); Valery Bychenkov, Moscow (RU)

(73) Assignee: The Regents of the University of Michigan, Ann Arbor, MI (US)

( * ) Notice: Subject to any disclaimer, the term of this patent is extended or adjusted under 35 U.S.C. 154(b) by 267 days.

(21) Appl. No.: 10/035,819

(22) Filed: Nov. 8, 2001

(65) Prior Publication Data

US 2002/0172317 A1 Nov. 21, 2002

Related U.S. Application Data

(60) Provisional application No. 60/247,024, filed on Nov. 8, 2000.

(51) Int. Cl.[7] ............................................... G21G 1/10
(52) U.S. Cl. ..................... 376/190; 376/166; 376/192; 376/194; 376/199
(58) Field of Search ............................. 376/166, 190, 376/192, 194, 199

(56) References Cited

U.S. PATENT DOCUMENTS

| | | | | |
|---|---|---|---|---|
| 3,935,504 A | * | 1/1976 | Guillaneux et al. | 376/145 |
| 4,654,183 A | * | 3/1987 | Hershcovitch | 376/130 |
| 4,870,287 A | * | 9/1989 | Cole et al. | 250/492.3 |
| 5,037,602 A | * | 8/1991 | Dabiri et al. | 376/198 |
| 5,142,153 A | * | 8/1992 | Gomberg | 250/390.04 |
| 5,247,177 A | * | 9/1993 | Goldberg et al. | 250/358.1 |
| 5,280,505 A | * | 1/1994 | Hughey et al. | 376/156 |
| 5,586,153 A | * | 12/1996 | Alvord | 376/196 |
| 5,737,376 A | * | 4/1998 | Hirose | 376/194 |
| 5,789,876 A | * | 8/1998 | Umstadter et al. | 315/507 |
| 6,130,926 A | * | 10/2000 | Amini | 376/194 |
| 6,433,495 B1 | * | 8/2002 | Wiberg | 315/502 |
| 6,668,033 B1 | * | 12/2003 | Schelten | 376/159 |

FOREIGN PATENT DOCUMENTS

| | | | |
|---|---|---|---|
| CA | 2325362 | * | 11/2000 |
| DE | 004402774 | * | 7/1994 |
| GB | 2237139 | * | 10/1990 |
| JP | 2002-107494 | * | 9/2000 |

OTHER PUBLICATIONS

Maksimchuk et al, "Forward Ion acceleration in thin films driven by a high–intensity laser", Physical Review Letter, May 1, 2000 (received for publication Sep. 3, 1999), pp. 4108–4111.*

* cited by examiner

Primary Examiner—Michael J. Carone
Assistant Examiner—John Richardson

(57) ABSTRACT

A system is provided for generating high-energy particles and for inducing nuclear reactions. The system includes a laser and for emitting a laser beam, an irradiation target for receiving the laser beam and producing high-energy particles, and a secondary target for receiving the high-energy particles, thereby inducing a nuclear reaction. A method is also provided including producing a laser beam of high-intensity with an ultra-short pulse duration, irradiating the laser beam onto an irradiation target in order to ionize the irradiation target and produce a collimated beam of high-energy particles, and colliding the collimated beam of high-energy particles onto a secondary target containing a nuclei, thereby inducing a nuclear reaction on the secondary target.

18 Claims, 3 Drawing Sheets

METHOD AND APPARATUS FOR HIGH-ENERGY GENERATION AND FOR INDUCING NUCLEAR REACTIONS

CROSS-REFERENCE TO RELATED APPLICATIONS

This application claims the benefit of U.S. Provisional Application No. 60/247,024, filed Nov. 8, 2000.

GOVERNMENT SUPPORT

This invention was made with government support under grant No. 8920108 awarded by the National Science Foundation.

FIELD OF THE INVENTION

The present invention relates generally to a method for generating high-energy particles using high-intensity short laser pulses and, more particularly, to a method for inducing nuclear reactions.

BACKGROUND OF THE INVENTION

There are a number of radioisotopes that are currently being utilized as markers and for other purposes in various medical, scientific, industrial and other applications. However, radioisotopes frequently have a relatively short half-life, from a few hours to a few minutes. Therefore it is generally desirable that such radioisotopes be either produced at the site where they are going to be utilized, or at a site relatively close thereto.

The short-lived radioisotopes are administered by intravenous injection or by having the subject inhale a gas containing small quantities of the radioisotope. Isotopes which are often incorporated into such gases or injection are carbon-11, nitrogen-13, oxygen, and fluorine-18. In Positron Emission Tomography (PET) facilities, these radioisotopes are derived from boron, carbon, nitrogen, and neon targets, respectively, by bombarding the targets with high-energy (approximately 6–30 MeV) protons or deuterons obtained from a particle accelerator.

The particle accelerator that is conventionally used to produce the isotope-generating particles is a cyclotron accelerator. Unfortunately, cyclotron accelerators suitable for use in the medical environment are very expensive (on the order of 1–2 million dollars), large and heavy (15–20 tons) and require a trained staff to operate and maintain the apparatus. Thus, the accelerator must be physically located in a medical center located within a short distance from the PET scanning apparatus.

Additionally, the high-energy particles produced by the cyclotron accelerator are generally used to bombard gas targets to obtain the isotopes. Gas targets must be separated from the high vacuum of the accelerator by a metallic foil window. Unfortunately, if the particles are accelerated with very high energies, the window is rapidly destroyed, thus increasing the cost of maintenance and requiring highly trained operators who must disassemble the device to replace the window.

Therefore, it is desirable to provide a method and apparatus for generating high-energy particles to induce nuclear reactions, thereby instantly producing radioisotopes. Moreover, it is desireable to provide such a method and apparatus that can be practically used for real-world medical applications and in low cost. For example, a method for generating high-energy ions would be beneficial for cancer hadron therapy because of the possible decrease in absorbed radiation.

SUMMARY OF THE INVENTION

The present invention provides a system for generating high-energy particles and for inducing nuclear reactions. The system includes a laser for emitting a laser beam, an irradiation target for receiving the laser beam and producing high-energy particles, and a secondary target for receiving the high-energy particles, thereby inducing a nuclear reaction. A filter and a monitor may be installed to estimate the energy of the high-energy particles, however these elements are not necessary to induce nuclear reactions and can be omitted.

The present invention also provides a method for generating high-energy particles and for inducing nuclear reactions. The steps of the method include producing a laser beam of high-intensity with an ultra-short pulse duration, irradiating the laser beam onto an irradiation target in order to ionize the irradiation target and produce a collimated beam of high-energy particles, and colliding the collimated beam of high-energy particles onto a secondary target containing a nuclei, thereby inducing a nuclear reaction in the secondary target.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various features, advantages and other uses of the present invention will become more apparent by referring to the following description and drawings, wherein.

DETAILED DESCRIPTION OF THE PREFERRED EMBODIMENTS

The present invention is directed towards a method for generating high-energy particles which are then used to produce nuclear reactions. The method can supply X-ray, electron beam, ion beam and radioisotopes used in radiation therapy, medical radioisotope production, and material diagnostics. The present invention also makes nuclear devices available for applications such as medical diagnosis like positron emission tomography, material inspection, nuclear transformation, and nuclear reaction simulation.

Figure 1:
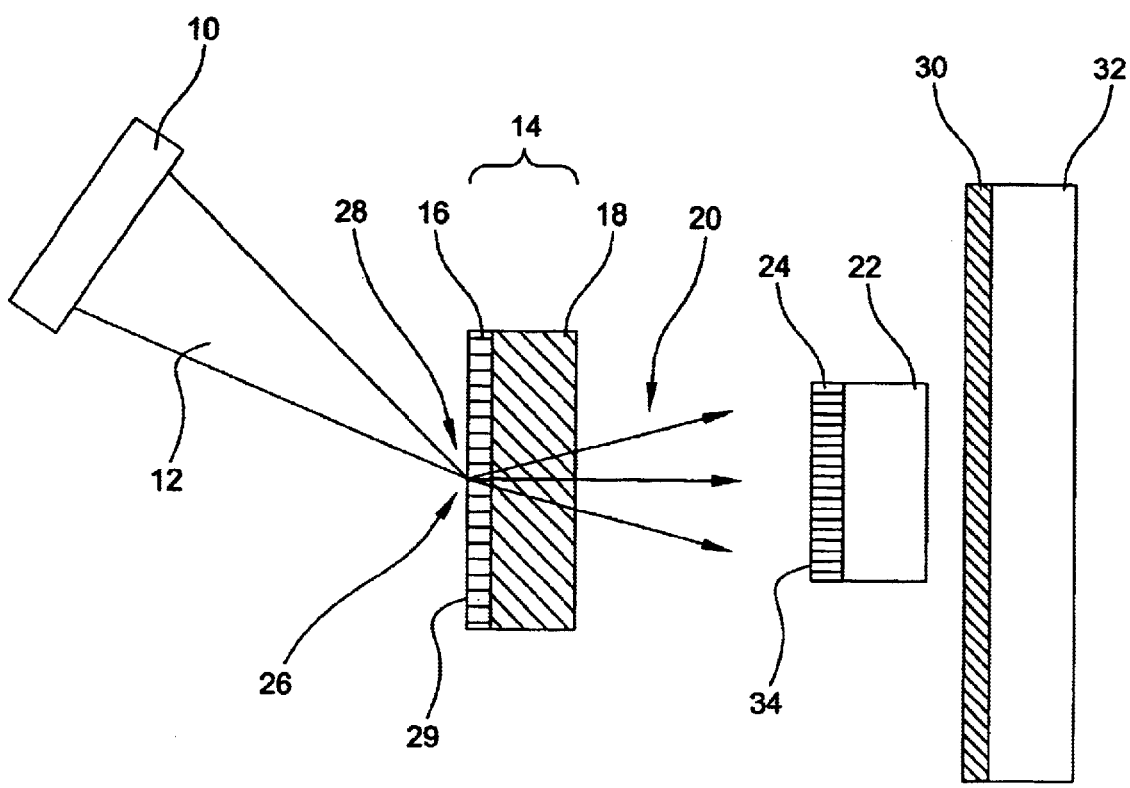
FIG. 1 is a schematic illustration of the apparatus for generating high-energy particles and for inducing nuclear reactions.

Referring now to the drawings, FIG. 1 illustrates a laser and laser irradiation equipment 10 emitting a laser beam 12. An irradiation target 14 is disposed downstream from the laser 10 and in radiation receiving relation to the beam 12. The irradiation target 14 is comprised of a thin film 16, such as a Mylar film having a thickness of about 10 micrometers, coated with a plastic layer 18, such as a deuterated plastic layer.

Upon bombardment with the laser beam 12, the irradiation target 14 produces a collimated beam of high-energy particles 20. The high-energy particles 20 are accelerated toward a secondary target 22 disposed downstream of the irradiation target 14. The secondary target 22 contains nuclei and is enriched with, for example, boron-10 up to 90% in concentration, thereby inducing a nuclear reaction. This nuclear reaction allows for the production of radioisotopes and alpha particles. The secondary target 22 may also take the form of a patient in the case of radiation therapy such as cancer hadron treatment.

The secondary target 22 is preferably located axially offset from the irradiation target 14 and on the opposite side as the laser 10. The secondary target 22 includes an activation region 24 where the nuclear reaction is localized. Although not required, the activation region 24 is preferably a planar member oriented normal to a central axis of the cone of high energy particles 20.

Although the irradiation target 14 is illustrated as a thin film solid, gas jets can be used as the irradiation target 14. For example, super sonic gas jets can be irradiated by the laser beam 12. Moreover, the secondary target 22 enriched with boron-10 can be a solid, liquid jet, or a droplet jet target of some other element.

Figure 2:
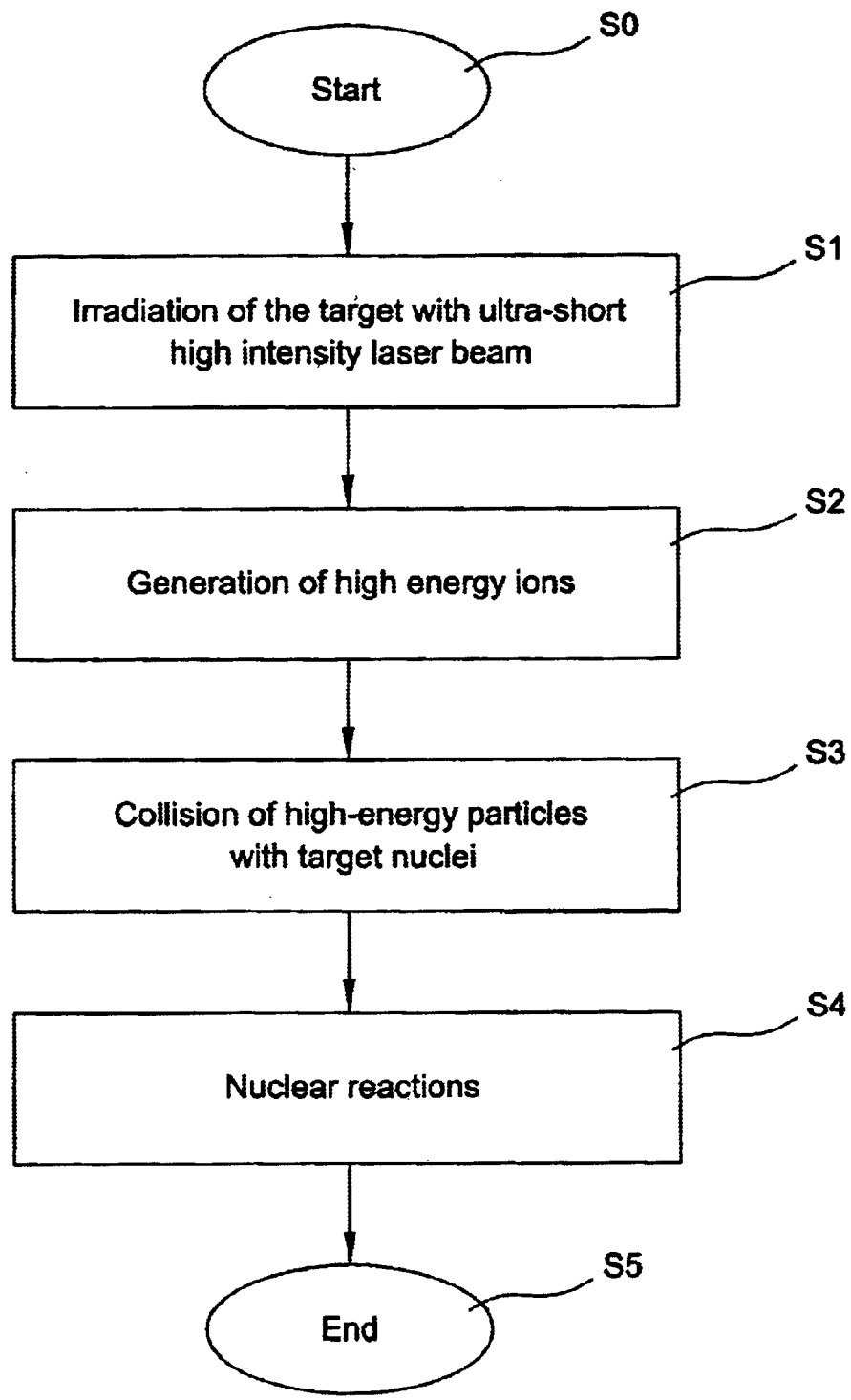
FIG. 2 is a flowchart illustrating the method for inducing nuclear reactions.

Referring now also to FIG. 2, the operation of the present invention will be described. At step S0, the laser and laser irradiation equipment 10 is turned on. In step S1, the irradiation target 14 is irradiated with the ultra-short high-intensity laser beam 12. This results in the generation of high-energy particles 20 in step S2. In step S3, the high-energy particles 20 collide with the secondary target 22 containing nuclei in the activation region 24. This induces a nuclear reaction in step S4. At step S5, the method ends or can be repeated.

Referring again to FIG. 1, the method will be described in greater detail. The laser and irradiation laser equipment 10 focuses a laser beam 12 on a small focusing area 26 on the irradiation target 14 by focusing optics. The laser beam 12 preferably has an intensity greater than $10^{18}$ W/cm$^2$, and a pulse duration shorter than 10 picoseconds. This allows for an instant production of particles with high energies.

The concentrated energy of the focused laser beam 12 ionizes the irradiation target 14 which raises the temperature of the target 14 and then produces plasmas that consists of free electrons and ions. The electrons are then expelled and accelerated from the small focusing area 26 to high energies by very strong electro-magnetic fields or light pressure from the laser beam 12. The expelling may also be due to a plurality of traveling plasma waves induced by the laser beam 12 or stimulated scattering produced by the laser beam 12 hitting the irradiation target 14. The small region 28 where plasmas are produced is preferably less than about 1 mm, thereby making it possible to obtain a radiation shielding area smaller than the radiation shielding areas required in conventional accelerators.

Once the electrons are expelled from the target 14, the ions are left due to their large inertia. This produces a charge separation, which in turn produces an electric field. The ions having a pulse duration shorter than $10^{-9}$ are accelerated by the electric field to high energy levels, for example greater than 100 keV, due to the high intensity of the laser beam 12 that produces the large electric field. This results in the generation of high-energetic particles 20.

The charge separation is sustained until electrons coming from the areas surrounding region 28 neutralize the charge separation. The direction of the high-energy ion emission is preferably limited within some angle, for example 40 degrees, around the normal direction of the surface 29 of the target 14. This simplifies the use of the high-energy particles 20.

Under the above circumstances, the electric field exceeds 10 GeV/cm. As such, the acceleration length is 5 to 6 orders of magnitude shorter than conventional accelerators. The number of ions accelerated exceeds $10^{10}$ particles, proving a peak current of a few kilo-amperes, which is 3 to 4 orders of magnitude higher than what conventional accelerators produce.

As described above, the high-energy particles 20 emitted toward the secondary target 22 placed behind the irradiation target 14 induce nuclear reactions. That is, the bombardment of the particles 20 on the secondary target 22 produces positron active isotopes. However, it should be noted that nuclear reactions are also capable of being induced within the irradiation target 14, in which case the secondary target 22 can be omitted.

Laser beam 12 preferably has a pulse duration less than 10 pico-seconds. When the pulse duration is longer than 10 pico-seconds, the diffusion of ions produced by the laser beam 12 starts before the end of the laser beam 12. Thus, the charge separation region 28 is not able to grow large enough to accelerate the ions up to a high energy level, which is desired. On the other hand, a pulse duration less than 10 pico-seconds makes for a larger charge separation, thus making a higher electric field, which is required for the production of high-energy particles 20. The laser beam has a repetition rate greater than or equal to about $10^{-3}$ Hz.

Figure 3:
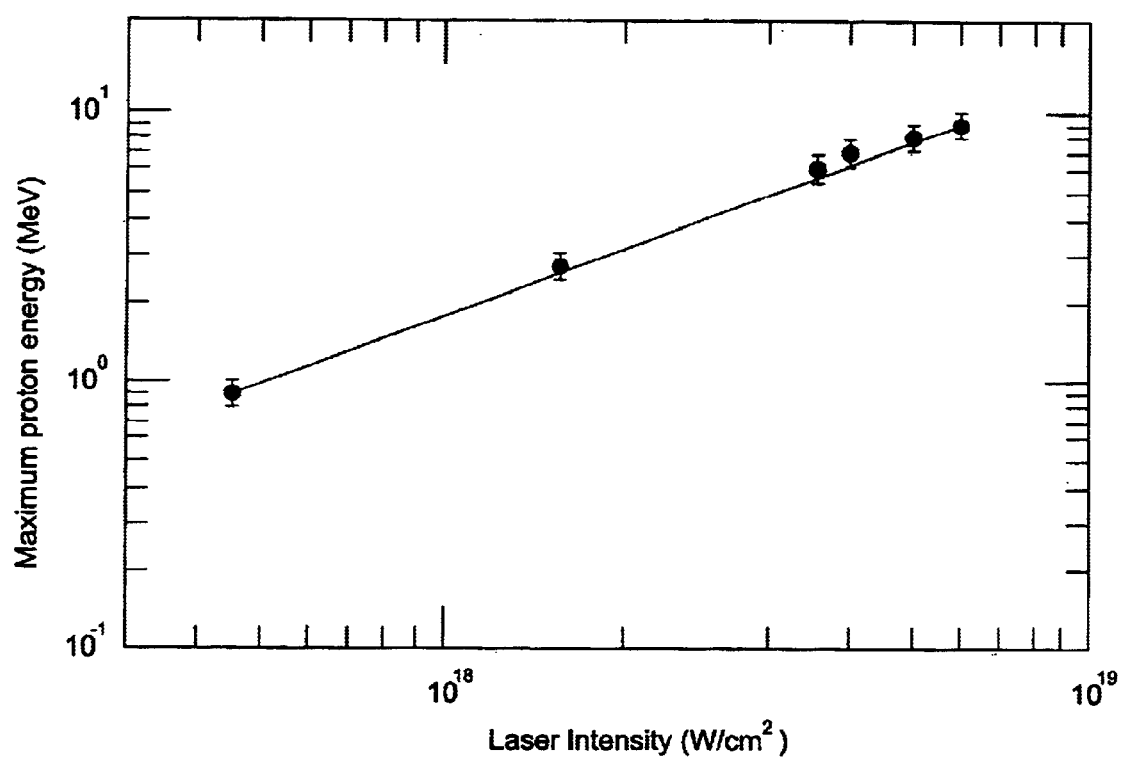
FIG. 3 is a graph illustrating the relationship between laser intensity and maximum energy of generated ions.

FIG. 3 is a graph illustrating the relationship between the laser beam intensity (laser beam 12) and the maximum energy of the generated ions (particles 20). As can be seen, by irradiating the irradiation target 14 with the laser beam 12, positive ions can be generated as high energy particles 20 and accelerated up to high energy levels such as 10 MeV. These levels are not attainable with conventional cyclotrons. Nonetheless, it is not always necessary to accelerate the high-energy particles 20 to 10 MeV. For example, 100 keV would be enough energy to accelerate certain particles to induce a nuclear reaction.

One type of laser and irradiation equipment 10 used is the hybrid Ti:Al2O3/Nd:phosphate glass CPA laser with a power of 10 TW. This type of laser is able to emit a laser beam 12 with 0.4 picosecond pulse duration and about 3 Joules of energy. To accomplish this, the laser 10 first stretches laser pulses emitted from an oscillator by a pulse stretcher, then amplifies these stretched pulses by amplifiers, and finally increases the peak intensity by compressing the pulse duration by a pulse compressor.

Thereafter, this ultra-short pulse with a high peak intensity is focused by focusing optics, and is irradiated onto the deuterated plastic layer 16 of the irradiation target 14. The laser beam 12 can be irradiated onto the deuterated plastic layer 16 on the irradiation target 14 with a focusing diameter of 10 micrometers. Of course other types of lasers and irradiation equipment may be used.

Although not shown in the figures, shields can be placed around the activation region 28 in order to contain the radiation. Since the ultra-short pulse laser beam 12 is used to generate the high-energy particles 20 for inducing the nuclear reactions, the size of the entire above-described apparatus is relatively small. As such, any shield employed can be simple compared with the method of inducing nuclear reactions using nuclear reactors and accelerators.

The control of nuclear reactions is made easy by the present invention because nuclear reactions are induced by irradiation of the laser beam 12 from the laser and laser equipment 10. The laser 10 preferably has an on/off feature that can start and stop the laser beam 12, which is used for the production of the nuclear reactions. Also, by adjusting the focusing intensity and the energy of the laser beam 12, the energy of the generated high-energy particles 20 can be controlled, and therefore nuclear reactions can be controlled.

One way to detect the energy of the high-energy particles 20, is by installing a filter 30 made of, for example, Polyethylene Terephthalate and a monitor 32, shown in FIG. 1. Preferably, these elements are disposed downstream of the secondary target 22 on an opposite side as the irradiation target 14. The filter 30 and the monitor 32 are used to estimate the energy of the high-energy particles 20 irradiated onto the secondary target 22.

More particularly, only particles with certain energy levels will penetrate the entire thickness of the filter 30. If the monitor 32 detects particles 20 behind filter 30, then the particles 20 achieved a given energy or more. For example, energy of about 1 MeV is necessary for protons to penetrate the filter 30 with a 10 micron thickness. Therefore, when the monitor 32 detects protons, the proton energies are greater than 1 MeV. Of course, the filter 30 and the monitor 32 are not necessary to generate high-energy particles 20 or induce nuclear reactions and therefore do not have to be installed.

The production of radioisotopes by a nuclear fusion reaction with the present invention will now be discussed in greater detail. In this example, the plastic layer 16 of the target 14 is made of deuterated plastic. Further, the secondary target is made of boron-10.

Ion particles 20, which are streams of positive ions, are emitted from target 14 with an angle of about 40 degrees. More particularly, the ion particles 20 irradiate from the deuterated plastic layer 16 on the irradiation target 14 and thus produce high energy ion particles 20 of deuteron. The high-energy deuteron particles 20 then collide with the boron-10 secondary target 22. Thus, a nuclear reaction 10B(d,n)11C inside the secondary target 22 is induced. Because of this, carbon11 (11C), which is a radioisotope, and neutrons(n) are produced.

Usually, nuclear reactions are induced in the region 24 located between the surface 34 of the secondary target 22 and a depth of about 1 mm. Therefore, the produced carbon-11 absolutely remains inside the target 22.

In another example, the deuterated plastic layer 16 can be omitted from the irradiation target 14, and normal boron instead of boron-10, can be used as the secondary target 22. In this case, protons are mainly generated as high-energy particles 20 when the laser beam 12 irradiates the irradiation target 14. The nuclear reaction in this case, 11B(p,n)11C, can be induced when the high energy proton particles 20 collide with the boron enriched secondary target 22. Once again, carbon-11, which is a radioisotope, and neutrons are produced.

The produced carbon-11 is a pure positron emitter with a half-life of 20 minutes and can be used for diagnostics in medicine and defect diagnostics for materials. Carbon-11 is more manageable as a nuclear material than natrium-22 because the radioactivity of carbon-11 decays so much, even in one night due to its short half-life of 20 minutes. Carbon-11 of 2 nano-curie can be produced by one pulse with the aforementioned energy of the laser beam 12. Carbon-11 of 10 micro-curie can also be produced when the laser beam 12 is irradiated with a 10-Hz pulse repetition rate for 1 hour. This radioactivity is the same level as that from a commercial natrium-22 as a calibration source.

Although the irradiation target 14 has been described as generating high-energy particles 20 by the laser beam 12, high energy X-rays can also be generated. The high intensity laser beam 12 passes through the irradiation target 14 and the generated X-rays are emitted in a direction normal to the surface 29 irradiated by the laser beam 12 and opposite the laser and laser irradiation equipment 10.

When the X-rays have energies higher than 1.02 MeV, an electron and a positron can be produced. This is done through the interaction of the irradiation target 14 and other materials. Therefore, electrons, X-rays and positrons can be generated as high-energy particles 20.

The high-energy particles 20 can also be positive ions that can induce nuclear fusion or nuclear fission with other materials inside the irradiation target 14. Nuclear reactions such as (gamma, n) can be induced by the gamma-rays generated from the above-mentioned nuclear reactions. This nuclear reaction can also produce isotopes and neutrons, which are used in medicine.

It should be understood that by changing the combinations of the materials of the irradiation target 14 and the secondary target 22, many reactions other than the ones mentioned above, (10B(b,n)11C and 11B(p,n)11C), can be produced. As one example, by using a material containing hydrogen for the irradiation target 14, protons (p) can be generated as the high energy positive ion particles 20. By colliding these high energy proton particles 20 with a secondary target 22 containing nitrogen-14, the nuclear fusion 14N(p,alpha)11C can be induced, and carbon-11, which is a radioisotope with a short half-life, and alpha particles can be produced.

Other combinations include colliding protons as the high energy particles 20 with a secondary target 22 containing oxygen-16. This can induce the nuclear fusion 16O(p,alpha)13N, and nitrogen-13, which is a radioisotope with a short half-life, and alpha particles can be produced. By colliding protons as the high energy particles 20 with a secondary target 22 containing oxygen-18, the nuclear fusion 18(p,n)18F can be induced, and fluorine-18, which is a radioisotope with a short half-life, and neutrons can be produced. By colliding protons as the high energy particles 20 with a secondary target 22 containing boron, the nuclear fusion 10B(p,alpha)7 Be can be induced, and Beryllium-7, which is a radioisotope with a short half-life, and alpha particles can be produced. By colliding protons as high energy particles 20 with a secondary target 22 containing nitrogen-15, the nuclear fusion 15N(p,n)15O can be induced, and oxygen-15, which is a radioisotope with a short half-life, and neutrons can be produced.

By using an irradiation target 14 containing deuterium, deuterons are mainly generated as the high-energy positive ion paticles 20. Therefore, by colliding these high energy deuterons with a secondary target 22 containing carbon-12, the nuclear 12C(d,n) 13N can be induced, and nitrogen-13, which is a radioisotope with a short half-life, and neutrons can be produced. By colliding deuterons as the high energy particles 20 with a secondary target 22 containing nitrogen-14, the nuclear fusion 14N(d,n)15O can be induced, and oxygen-15, which is a radioisotope with a short half-life, and neutrons can be produced. By colliding deuterons as the high energy particles 20 with a target 22 containing neon-20, the nuclear fusion 20Ne(d,alpha)18F can be induced, and fluorine-18, which is a radioisotope with a short half-life, and alpha particles can be produced.

The energy of the particles 20 generated by the irradiation of the laser beam 12 (such as X-rays and positive ions) can be more than the threshold energy for nuclear fissions, so the nuclear reaction can be easily induced. For example, by using materials containing hydrogen as the irradiation target 14 and the materials containing uranium as the secondary target 22, and by colliding the high energy proton particles 20 with 10 MeV onto the secondary target 22, nuclear fission of uranium can be induced.

Additionally, by colliding the high-energy particles 20 generated from the irradiation target 14 onto the nuclei inside the secondary target 22, the nuclei can be excited, thus producing a nuclear isomer. The nuclear isomer can change from an exited nuclear isomer state to a stable state, thus obtaining a gamma ray source with a line spectral profile, which can be developed into a gamma-ray laser.

Although the aforementioned examples are among the most used examples, there are many applications for using this invention. For example, although the irradiation target 14 and the secondary target 22 are different and separated in the examples above, the irradiation target 14 and the secondary target 22 can be merged, and a nuclear reaction can be induced with nuclei inside the common target irradiated by the laser beam 12. In this case, the region where nuclear reaction is induced can be limited to the small region 28 close to the laser focusing area 26 irradiated by the laser beam 12.

Moreover, although the high energy particles 20 are mainly protons and deuterons in the above mentioned examples, triton can be used, and a mixture of these particles can also be used. Further, the laser beam 12 can be irradiated onto the irradiation target 14 repetitively with a pulse interval shorter than the half-life of the products by nuclear reactions. Therefore, the amount of isotopes with a short half-life can be increased by accumulation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of generating a collimated beam of high-energy particles comprising:
    producing a laser beam having an intensity greater than or equal to about $10^{18}$ W/cm$^2$ and a pulse duration less than or equal to about $10^{-9}$ seconds; and
    irradiating an irradiation target capable of releasing high energy ions with said laser beam,
    wherein said irradiation step produces a particle beam directed to within about 40 degrees of normal to said irradiation target.

2. A method of generating a collimated beam of high-energy particles comprising:
    producing a laser beam having an intensity greater than or equal to about $10^{18}$ W/cm$^2$ and a pulse duration less than or equal to about $10^{-11}$ seconds; and
    irradiating an irradiation target capable of releasing high energy ions with said laser beam.

3. A method of generating a collimated beam of high-energy particles comprising:
    producing a laser beam having an intensity greater than or equal to about $10^{18}$ W/cm$^2$ and a pulse duration less than or equal to about $10^{-9}$ seconds; and
    irradiating an irradiation target capable of releasing high energy ions with said laser beam,
    wherein said laser beam has a repetition rate greater than or equal to about $10^{-3}$ Hz.

4. A method of generating a collimated beam of high-energy particles comprising:
    producing a laser beam having an intensity greater than or equal to about $10^{18}$ W/cm$^2$ and a pulse duration less than or equal to about $10^{-9}$ seconds; and
    irradiating an irradiation target capable of releasing high energy ions with said laser beam,
    wherein said irradiation target further comprises one of a solid, a liquid jet, and a droplet jet.

5. The method of claim 3, wherein said irradiation step produces a particle beam with an energy level greater than or equal to about 100 keV.

6. A method of generating a collimated beam of high-energy particles comprising:
    producing a laser beam having an intensity greater than or equal to about $10^{18}$ W/cm$^2$ and a pulse duration less than or equal to about $10^{-9}$ seconds;
    irradiating an irradiation target capable of releasing high energy ions with said laser beam; and
    inducing a nuclear reaction by colliding said particle beam into a secondary target containing a nuclei.

7. The method of claim 6 wherein said secondary target is merged with said irradiation target.

8. The method of claim 6 wherein said particle beam includes at least one of protons, deuterons, and tritons.

9. The method of claim 6 wherein said secondary target further comprises at least one of boron, carbon, nitrogen, oxygen, and neon.

10. The method of claim 6 wherein said particle beam further comprises protons and said secondary target further comprises at least one of boron-11, boron-10, nitrogen-14, oxygen-16, nitrogen-15, and oxygen-18.

11. The method of claim 6 wherein said particle beam further comprises deuterons and said secondary target further comprises at least one of boron-10, carbon-12, nitrogen-14, and neon-20.

12. The method of claim 6 wherein said laser beam includes a pulse interval shorter than a half-life of isotopes produced by said nuclear reaction.

13. The method of claim 6 wherein said particle beam includes excited atomic nuclei.

14. An apparatus for generating a collimated beam of high-energy particles comprising:
    a laser adapted to generate a laser beam having an intensity greater than or equal to about $10^{18}$ W/cm$^2$ and a pulse duration less than or equal to about $10^{-9}$ seconds; and
    an irradiation target capable of releasing high energy ions disposed in irradiation receiving relation to said laser beam,
    wherein said irradiation target further comprises one of a solid, a liquid jet, and a droplet jet.

15. An apparatus for generating a collimated beam of high-energy particles comprising:
    a laser adapted to generate a laser beam having an intensity greater than or equal to about $10^{18}$ W/cm$^2$ and a pulse duration less than or equal to about $10^{-9}$ seconds;
    an irradiation target capable of releasing high energy ions disposed in irradiation receiving relation to said laser beam; and
    a secondary target containing a nuclei disposed downstream of said irradiation target and receiving a particle beam from said irradiation target to induce reaction.

16. An apparatus for generating a collimated beam of high-energy particles comprising:
    a laser adapted to generate a laser beam having an intensity greater than or equal to about $10^{18}$ W/cm$^2$ and a pulse duration less than or equal to about $10^{-9}$ seconds; and an irradiation target capable of releasing high energy ions disposed in irradiation receiving relation to said laser beam, wherein said secondary target is merged with said irradiation target.

17. An apparatus for generating a collimated beam of high-energy particles comprising:

a laser adapted to generate a laser beam having an intensity greater than or equal to about $10^{18}$ W/cm$^2$ and a pulse duration less than or equal to about $10^{-9}$ seconds; and an irradiation target capable of releasing high energy ions disposed in irradiation receiving relation to said laser beam, wherein said particle beam includes at least one of protons, deuterons, and tritons.

18. An apparatus for generating a collimated beam of high-energy particles comprising:

a laser adapted to generate a laser beam having an intensity greater than or equal to about $10^{18}$ W/cm$^2$ and a pulse duration less than or equal to about $10^{-9}$ seconds; and an irradiation target capable of releasing high energy ions disposed in irradiation receiving relation to said laser beam, wherein said secondary target further comprises at least one of boron, carbon, nitrogen, oxygen, and neon.

* * * * *